H. L. SPARKS.
ELECTRICAL TROLLEY REPLACER.
APPLICATION FILED MAY 4, 1908.
911,847.
Patented Feb. 9, 1909.
2 SHEETS—SHEET 1.
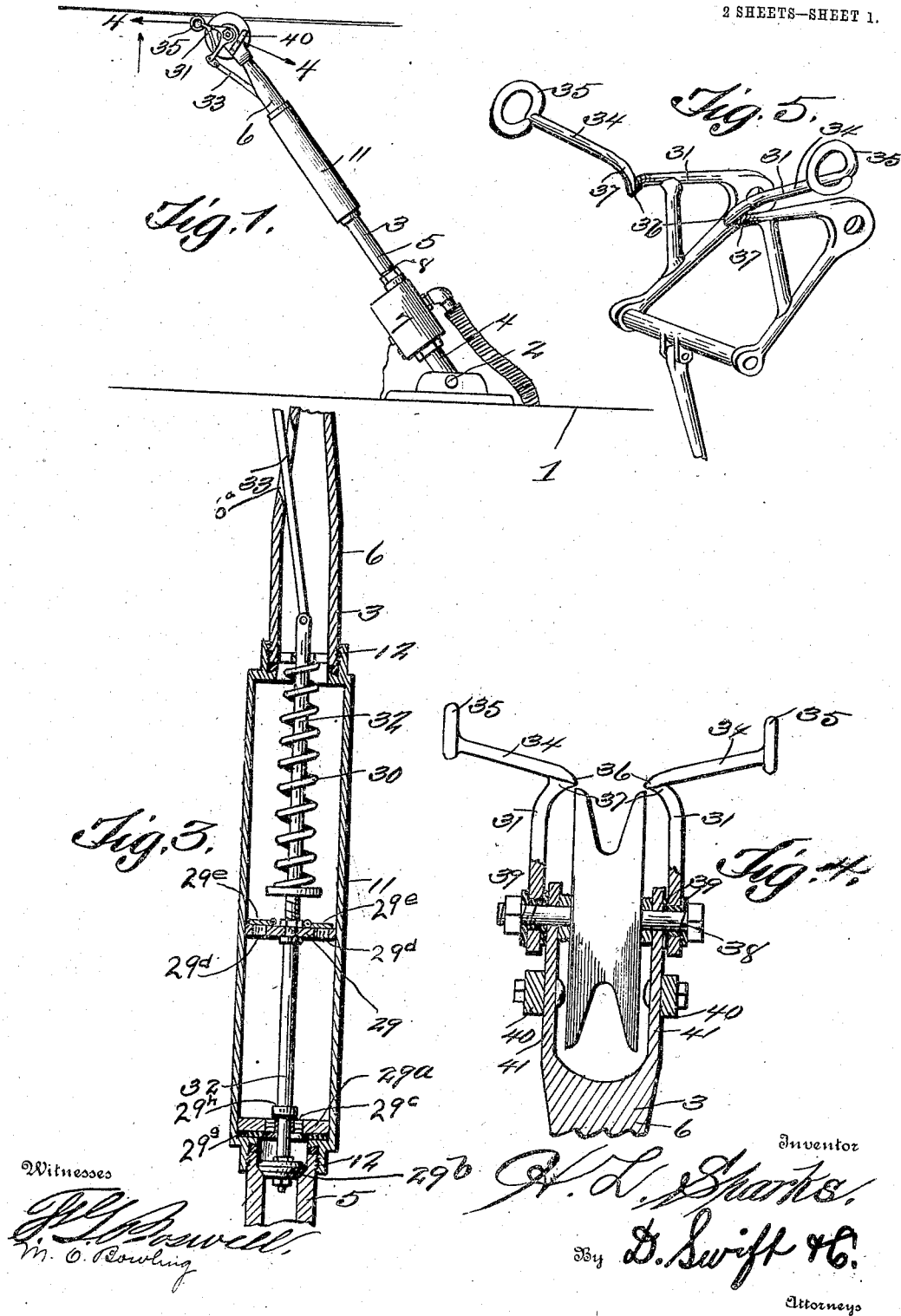

H. L. SPARKS.
ELECTRICAL TROLLEY REPLACER.
APPLICATION FILED MAY 4, 1908.
911,847.
Patented Feb. 9, 1909.
2 SHEETS—SHEET 2.
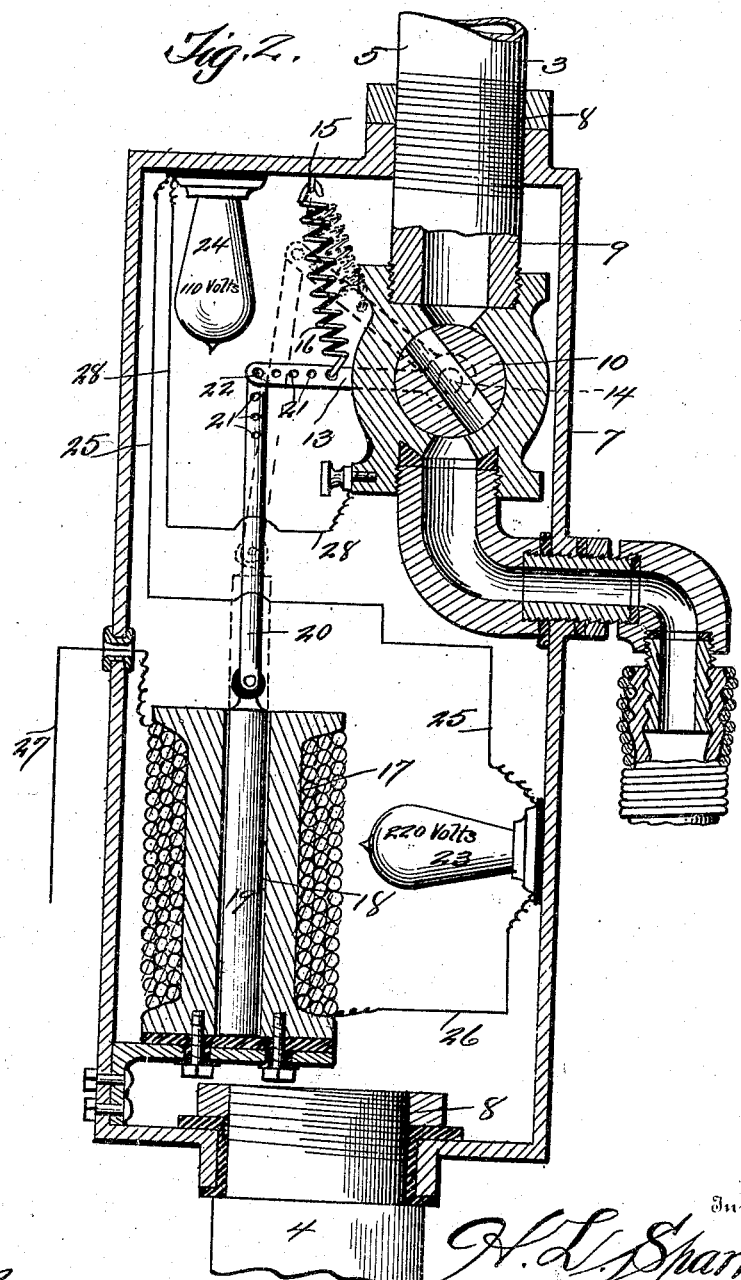

UNITED STATES PATENT OFFICE.

HUBERT L. SPARKS, OF PALESTINE, TEXAS, ASSIGNOR OF ONE-HALF TO F. M. McCONNELL, OF LONGVIEW, TEXAS.

ELECTRICAL TROLLEY-REPLACER.

No. 911,847.   Specification of Letters Patent.   Patented Feb. 9, 1909.

Application filed May 4, 1908. Serial No. 430,639.

*To all whom it may concern:*

Be it known that I, HUBERT LORENZO SPARKS, a citizen of the United States, residing at Palestine, in the county of Anderson and State of Texas, have invented a new and useful Electrical Trolley-Replacer; and I do hereby declare the following to be a full, clear, and exact description of the invention, such as will enable others skilled in the art to which it appertains to make and use the same.

The invention about to be set forth pertains to a new and useful electric automatic trolley replacer.

The invention in its basic principles resides particularly in a device of this character by which the trolley is automatically and electrically replaced, in engagement with the trolley wheel, as will be readily manifest.

The invention directs as a further object to provide means comprising new and useful combinations of parts and features, the arrangement and operation of which being such as will enable the trolley to be automatically and electrically replaced upon the trolley wheel, by the opening of the circuit between the car and the trolley, as will be evident.

The invention cites as a further object to provide such a device having a solenoid or magnet, and by the opening of said circuit the solenoid or magnet will be deënergized, thus causing certain mechanical parts and features of the invention to operate, which readily replaces the trolley. By opening the said circuit and deënergizing said solenoid or magnet, a valve is automatically opened which allows compressed air to enter a cylinder, forming a section of the trolley pole, in which cylinder a suitable piston is disposed, which is forced upward by the compressed air thus causing pivotal arms or levers to restore or replace the trolley, after which replacement the said circuit is again c osed, which energizes the solenoid, so that its core will be sucked therein, which closes said valve, thereby cutting off the supply of compressed air, thus allowing the piston within the cylinder to be restored to its normal position, by the expansion of a suitable spring.

This invention comprises further objects and combinations of elements which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice, with the understanding that the changes and variations accruing from said reduction to practice are limited to the scope of the appended claims.

To obtain a full and correct understanding of the details of construction, combinations of features, elements and advantages, reference is to be had to the hereinafter set forth description and the accompanying drawings in connection therewith, wherein—

Figure 1 is a side elevation of the upper portion of a car, showing a suitable trolley pole, wheel and wire, which trolley pole is provided with the new and useful trolley replacer. Fig. 2 is an enlarged sectional view through the lower portion of the trolley pole, and its connection to the car. Fig. 3 is an enlarged sectional view of the upper portion of the trolley pole, clearly illustrating the cylinder therein and its piston. Fig. 4 is a sectional view on line 4—4 of Fig. 1, clearly illustrating the contour of the arms or levers for replacing the trolley. Fig. 5 is a detail perspective view of said arms or levers, showing its connection with relation to the shaft or pin of the trolley wheel.

In regard to the drawings, wherein similar reference characters indicate corresponding parts in the several illustrations, by figures, 1 designates the upper portion of a car, to which the usual connection 2 for the trolley pole 3 is connected, as seen clearly in Fig. 1 of the drawings. The trolley pole 3 comprises three sections, designated respectively by the numerals 4, 5 and 6, as seen clearly in Fig. 2. Between the sections 4 and 5 a casing 7 is interposed, which is connected to the sections 4 and 5 by threaded unions, as seen at 8.

Disposed in the upper right hand portion of said casing 7 is a section of piping 9, in which a suitable valve 10 is provided, by the opening or closing of which the admission or the cut-off of compressed air is controlled, which compressed air when admitted passes through the section 5 into the cylinder 11, which is connected by threaded unions 12 to the said sections 5 and 6, as seen clearly in the drawings. To operate the said valve 10, a suitable lever 13 is connected to the stem 14 of said valve, between which lever 13 and the portion 15 of the casing a contracting spring 16 is positioned, which has a tendency to draw the said lever upward for opening said valve. The said lever 13 is drawn upward when the solenoid or magnet 17 is deënergized, by the opening of the circuit between the trolley and the car, as will be clearly evident. The said solenoid is provided with a bore 18 in which a core 19 is positioned, between which and the lever 13 a link 20 is connected, as seen clearly in the drawings. The said link 20 and the lever 13 are provided with apertures 21, by which the bolt or pin 22, forming the pivotal connection between the link 20 and the lever 13, may be adjusted therein, so as to increase the action of the spring 16, that is, when the core of the solenoid is in the act of being drawn therein.

Positioned within the casing 7 are two lamps 23 and 24, for promoting electrical resistance one preferably of two hundred and twenty volts while the other is preferably of one hundred and ten volts, which lamps are in circuit with the solenoid, by the leads 25 and 26, as seen clearly in Fig. 3 of the drawings. The solenoid and the lamp 24 are in circuit with the controller, (not shown) of the car, by the means of the leads 27 and 28, and by the openings of the circuit between the trolley and the car the said solenoid is deënergized, thus losing its magnetism and allowing the core 19 to be drawn upward by the tension of the spring 16, as seen clearly in the drawings.

When the valve 10 is open, compressed air is admitted into the cylinder 11, so as to act upon the piston 29, for the purpose of forcing the same upward, against the expansion of the spring 30; the forcing of the piston upward causes the oscillating levers or arms 31 to be operated, through the medium of the rod 32 and the link 33, which connect between said piston and said levers or arms, as will be understood from the drawings. The rod 32 is provided adjacent to its lower end with a supplemental piston or disk $29^a$, which not only assists in forcing the piston 29 and its piston-rod 32 upward, but also guides the said rod or piston 32 during its upward movement. It is to be seen that if it were not for the lower piston $29^a$, the rod or piston 32, would wabble or be displaced, that is especially, when the valve $29^b$ is lifted or raised entirely from its seat, and from within the pipe or section 5, as will be readily manifested Each lever or arm is triangular in side elevation, but in front elevation it will be noted that the said arm or lever is provided with a lateral projection 34, which is slightly inclined, as seen in Figs. 4 and 5, the end of which lateral projection is slightly extended upward, so that when the trolley is disengaged or derailed from the trolley wheel, the said upward projection 35 will throw the same in engagement with the said wheel, that is, when the said arm or lever is oscillated. The said lateral projections and the body of the levers or arms connect at a point indicated by the numeral 36, and at which junction a projection 37 is formed, which slightly extends over and above the flanges of the trolley wheel, as seen clearly in Fig. 4 of the drawings.

The piston or disk $29^a$ is provided with openings $29^c$, the purpose of which will hereinafter appear, while the disk or piston 29 is provided with apertures $29^d$, with which the valves $29^e$ coöperate, as shown clearly in Fig. 3 of the drawings. When the trolley wheel has left the trolley wire, the electric circuit is broken, the plunger 19 being withdrawn from within the magnet or solenoid 17, by means of the contraction of the spring 16, thus opening the valve 10; the opening of the valve 10 allows air to be admitted from any suitable source through the trolley pole, thus forcing up the piston or disk $29^b$, until it contacts with its seat $29^c$, then the pistons $29^b$, $29^a$ and 29 and their rod all move together the required distance, until the levers or arms 31 are operated sufficient to replace the trolley wheel and trolley wire into coöperation. After the trolley wheel and trolley wire have been placed into coöperation, the circuit is closed, thus causing the plunger 19 to be sucked into the magnet or solenoid, thereby closing the valve 10, and cutting off the admission of compressed air. After the circuit is closed, the expanding action of the spring 30 is brought into play, thus imparting movement to the pistons $29^b$ and 29, their movements being slightly in advance of the movement of the piston $29^a$, which is not moved until contacted with by the shoulder $29^h$ upon the said rod 32, and when the piston $29^b$ leaves its seat $29^c$, the compressed air that is below the piston $29^b$, and above the valve 10, is allowed to escape through the openings $29^c$ of the valve $29^a$, and also through the apertures $29^d$, which are covered, normally, by the valves $29^e$, and through the remainder of the trolley pole to the atmosphere, by way of the opening $6^a$. The compressed air, which passes through the openings of the piston $29^a$, is of sufficient pressure to raise the valves $29^e$, as will be clearly evident. The said levers or arms are insulated from the shaft or pin 38, as seen at 39. To limit the movement of the arms or levers, a strip of insulating fiber 40 is bolted to the sides of the forks 41 of the trolley pole, as seen in the drawings.

From the foregoing, the essential features, elements and the operation of the device, together with the simplicity thereof, will be clearly apparent.

The circuit between the trolley and the car is conducted through the controller box and other electrical apparatus (not shown) in the usual way, and the parts of the trolley replacing mechanism are insulated at the proper places, so as to prevent short circuiting.

Having thus fully described the invention, what is claimed as new and useful, by the protection of Letters Patent, is:—

1. In a trolley replacer, a trolley pole comprising a plurality of sections, a trolley wire, a trolley wheel to engage therewith, compressed air actuated means for replacing the trolley wheel when it leaves the wire, electrically controlled means for allowing the compressed air operated means to be actuated.

2. In a trolley replacer, a hollow trolley pole, a trolley wheel, a trolley wire, said pole having a cylinder therein, a piston mounted therein to be actuated by compressed air, a valve for controlling the admission of compressed air, means operated by said piston for replacing the trolley wheel, electrically controlled means for controlling said valve.

3. In a trolley replacer, a trolley wheel, a wire to engage therewith, a trolley pole, pivoted arms carried by the trolley pole, a cylinder, a piston mounted therein, means connecting said piston and said arms, a valve for controlling the admission of compressed air to said cylinder, means actuated by a solenoid for closing said valve, and resilient means for opening said valve when the solenoid is deënergized.

4. In a trolley replacer, a trolley pole, a trolley wheel, a trolley wire to be engaged thereby, said trolley pole having pivoted arms, a compressed air actuated piston having means for connection to said arms, a valve controlling the admission of compressed air upon said piston, electrical means for controlling said valve, and resilient actuating means for opening said valve when the said electrical means fails to receive current.

5. In a trolley replacer, a trolley wheel, a trolley pole therefor, a wire to engage said wheel, pneumatically operated means for automatically replacing the trolley wheel and wire into coöperation, and electrical means for controlling the pneumatically operated means.

In testimony whereof I have signed my name to this specification in the presence of two subscribing witnesses.

HUBERT L. SPARKS.

Witnesses:
C. W. HANKS,
BEN T. BROWN.